March 5, 1957     H. C. RHODES     2,783,719

DOUGH SHEETING ROLL

Filed March 28, 1949

INVENTOR.
Herbert C. Rhodes,
By Henry H. Snelling
Attorney

2,783,719

DOUGH SHEETING ROLL

Herbert Cecil Rhodes, Portland, Oreg., assignor, by mesne assignments, to Capitol Products Corporation, Mechanicsburg, Pa., a corporation of Pennsylvania Application March 28, 1949, Serial No. 83,853

2 Claims. (Cl. 107—12)

This invention relates to dough sheeting rolls and has for its principal object the provision of a roll of this type having a cylindrical surface of a plastic material which has an extremely low adhesive factor so that the dough has little or no tendency to stick to the roll.

A further object of the present invention is to provide for axial expansion of a plastic sleeve on a dough sheeting roll while preventing the dough from escaping between the rolls.

Other objects are particularly set forth in the claims and concern the configuration of the surface of the core or metal roller body and in the shape of the annular sections of the plastic sleeve.

Some of the new plastics are excellent for forming sleeves on dough sheeting rolls but these plastics while ideal in that they avoid the use of scrapers and consequently permit one to minimize the amount of flour used in sheeting, they also have a very high coefficient of expansion and since the rollers must necessarily fit together quite snugly, actually a sliding fit at the two ends, the expansion of the plastic sleeve is so great as to cause the plastic to buckle. If we shorten the axial length of sleeve to allow for expansion, we leave at each end a circumferential crack at a relatively low temperature of use and this is quite objectionable.

It is therefore a prime object of the present invention to design the plastic sleeve in such fashion that the amount of expansion at the lowest temperature of use is divided into a plurality of parts preferably so that the largest opening at minimum bakery temperature would be just short of the size of opening into which the dough would creep.

The best plastic used so far is a tetrafluoroethylene resin, readily obtainable under the trade name "Teflon." It is quite expensive and expands a great many times more than the cast iron body on which it is used but since it has such a very low adhesive factor, it is a highly desirable material but it must have provision for movement on the roller body. Other similar resins could be used and the term plastic is hereinafter used to indicated such materials. By forming the plastic sleeve in a considerable number of annular sections, we divide the total expansion and thus can keep the cracks between adjoining sections at a dimension so small that the dough will not work its way past the surface of the sheeting roll. This permits use of a method of sheeting which avoids the need for a scraper touching the roll and by that very feature lessens greatly the amount of flour that must be sifted on the dough being sheeted if all metal rolls are used.

Figure 1:
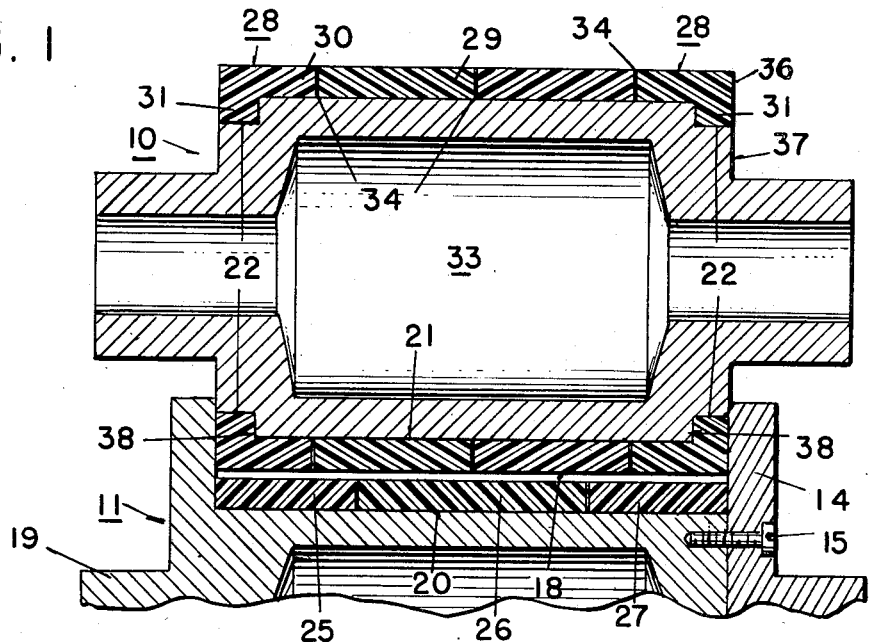
Figure 1 is a section thru a pair of sheeting rolls embodying my invention.

In Figure 1 is shown a pair of rolls 10 and 11 following general practice in that one of the rolls has end flanges 12 and 14, one of which such as 14 is detachable and is secured by a number of screws 15 which in normal rolls need only be four in number but with the present invention the number of these screws should be increased to eight or more, as the tendency to force the flange from the core 16 is considerable. One or both of the rolls is power driven and following usual custom the cylindrical surfaces of the two rolls are spaced to provide a pass clearance 18 which varies in size depending upon whether the pair of rolls forms the first, second, third or fourth pair of molding rolls. The distance apart of the axes of the rolls 10 and 11 is altered by well known mechanism not illustrated.

These dough sheeting rolls are made in a number of standard sizes and for clarity of illustration the particular roll chosen is an eight inch roll, that is the distance between the flanges 12 and 14 is eight inches. The roll illustrated as the lower roll in Figure 1 has a cast iron core 16 integral with the flange 12 and the trunnion 19 and this core has a surface 20 which is preferably cylindrical between the flanges. The corresponding surface 21 of the upper roll is preferably cylindrical at its center portion only as I provide at each side an annular recess 22. The plastic sleeves on the two rolls are each composed of a number of independent sections indicated by the numerals 25, 26 and 27 on the flanged roll 11 and by the numerals 28 and 29 on the upper roll.

Figure 2:
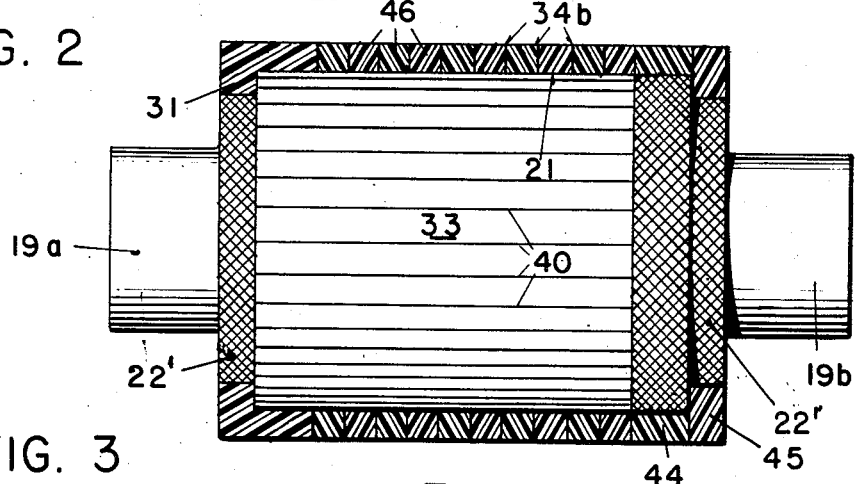
Figure 2 is a side elevation of the roller body, showing the sleeve in cross section.

I prefer that there be at least four sections in the upper roll and at least three in the lower roll but the number of either can be increased, as indicated in Figure 2. In Figure 1, however, I have illustrated the number of annular sections in the top roll as four, each of the two outer rings 28 consisting of a normal portion 30 and a deeper portion 31 making an L in section. This downturned lip 31 fits snugly in the groove 22 at either side of the roller body 33. It is my preference that the axial length of the end relief groove 22 shall be in the general nature of half an inch for an eight inch roll and preferably its depth is about the same distance. By virtue of this particular construction and by making the spaces 34 between adjacent annular sections of the sleeve total a distance to take up maximum expansion, the extremely valuable feature of keeping the sides 36 and 37 in perfect registry is achieved.

Since the expansion of the sleeve thru only a half inch between the shoulder 38 and the face 37 is so very tiny; while the downturned lip 31 does expand; it will never expand to a point where dough can creep between the end annular section 28 and the flange 12 or 14 of the other roll. Creepage of dough at this particular point is highly disadvantageous and by the present invention we substantially or entirely avoid any creepage of dough at either side. It will be noted that the diameter of flanges 12 and 14 is sufficiently great to extend beyond the cylindrical surface 22, and therefore the flange overlaps the side face 36 of the sleeve.

In Figure 2 the metal body 33 is shown in elevation. At the left hand side the preferred form is illustrated. The extended axles or trunnions are numbered 19a and 19b and in this case the surface 22 is knurled or crossgrooved or ribbed and the larger cylindrical surface 21 is grooved or ribbed parallel to the axis as indicated at 40.

At the right hand side of this figure I have shown a satisfactory but less desirable form. In this case in addition to the knurling of the surface 22 of the annular recess, I also knurl as at 42 a small portion of the larger cylinder. The effect of knurling is to prevent axial movement. At the left hand side the knurling only affects the cylindrical surface of the lip 31 so that the portion 22 of the same sleeve section may expand axially. At the right hand side the end section 45 is an annulus rectangular in cross section and the next section 44 is also rectangular in cross section and both are held against rotation and axial movement as well. Expressed differently, at the right hand side I have shown the end section of the sleeve, which would be 28 if integral, divided into two proportions 44 and 45. The grooves 40 form splines so that the several annular sections, here numbered 46, may each move axially.

In Figure 2 there are a great number of annular sections 46, their number being so chosen that the space between proximate sections when the roller is cold is less than the dimension which would permit creeping of the dough into the cracks between them. Merely as an element of clarification we may assume that the expansion of the plastic sleeve, preferably of tetrafluoroethylene resin in .045". The space 34 (with only two sections) would therefore be .015" and the dough would actually creep into this if the temperature of the bakery was at the lowest normal figure which would be perhaps 60° F. This creeping at the center point is not particularly troublesome because the dough does not stick to the plastic at all and as the plastic expands the dough is pushed out. It is most objectionable at the two sides, however.

In the construction of Figure 2 the number of sections has increased from three or four to say ten and consequently the space 34b between adjacent rings of the sleeve with a minimum temperature of use, would be less than the size at which the dough would force its way, yet expansion is provided so that the maximum temperature that could be expected in a bakery, perhaps 110°, would merely bring all of the rings or sections into firm contact with each other and with the flanges of the other roll.

Figure 3:
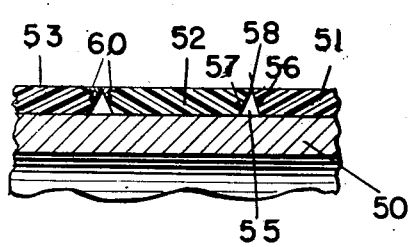
Figure 3 is a fragmentary view showing a modification.

In Figure 3 I have shown a form of sleeve which can be used but has not proven to be as satisfactory as the preferred forms shown in Figure 2. The modified form uses a greater number of sections than four. In this figure the shell of the roller body 33 is numbered 50 and three of the annular sections of the sleeve are numbered 51, 52 and 53. As noted in this figure the space 55 between adjacent sections 51 and 52 is triangular in section, the sides 56 and 57 sloping. In the figure the size of the triangle is greatly exaggerated for clarity but the base of the triangle is actually about .004". While we can increase the base of this triangle 55, it is unwise as at the point 58 the plastic sleeve edges tend to rise and this type of plastic wears rather badly. But decreasing the base of the triangle 55 gives results which are quite satisfactory. If desired the sharp points may be protected by a reenforcing angle piece 60 of better wearing material so that as the annular sections 52 and 53 move towards each other on the splined surface 21 the reenforcing members 60 take up the wear and the radial expansion is limited.

Figure 4:
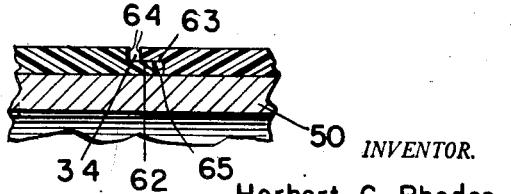
Figure 4 is a further modification.

In Figure 4 an expansion joint is formed by having coacting cylindrical surfaces 62 and 63 bounded by radial surfaces 64 and 65. The surfaces 62 and 63 will remain in constant contact during expansion of the adjacent sections and the depth of the space 34c is reduced by say half, more or less as desired. While this particular modification is quite satisfactory, it is more difficult to produce and the results obtained by using plurality of annular sections with perfectly vertical sides is practically as good and hence is preferred.

What I claim is:

1. A dough sheeting roll having an inner metallic load sustaining core and an outer sleeve of a plastic having an adhesive factor with respect to dough less than said core and an expansion factor greater than said core, said sleeve being formed of a plurality of annular sections, the adjacent end surfaces of each adjacent pair of sections being spaced less than .015" apart at about 60° F., the lowest normal ambient bakery temperature, and the number of sections being such that expansion of the sections is just equal to and takes up the spaces therebetween at about 110° F., the highest normal ambient bakery temperature.

2. A dough sheeting roll as in claim 1 wherein said load sustaining core is formed of cast iron and said sleeve is formed of a polymer of tetrafluoroethylene.

References Cited in the file of this patent

UNITED STATES PATENTS

| | | |
|---|---|---|
| 262,888 | Butler et al. | Aug. 15, 1882 |
| 534,071 | Mitchell | Feb. 12, 1895 |
| 682,607 | Eck | Sept. 17, 1901 |
| 932,038 | Maier | Aug. 24, 1909 |
| 998,512 | Heron | July 18, 1911 |
| 1,179,294 | Embrey | Apr. 11, 1916 |
| 1,281,003 | Henderson | Oct. 8, 1918 |
| 1,498,180 | Linder | June 17, 1924 |
| 1,883,184 | Weber | Oct. 18, 1932 |
| 2,070,199 | Dixon | Feb. 9, 1937 |
| 2,403,476 | Berry et al. | July 9, 1946 |
| 2,425,356 | Sticelber | Aug. 12, 1947 |
| 2,451,170 | McDowell | Oct. 12, 1948 |
| 2,490,616 | Brabazon | Dec. 6, 1949 |
| 2,699,737 | Sticelber | Jan. 18, 1955 |
| 2,715,879 | Sawyer | Aug. 23, 1955 |